(12) United States Patent
Takayama et al.

(10) Patent No.: US 12,034,335 B2
(45) Date of Patent: Jul. 9, 2024

(54) STATOR AND MOTOR

(71) Applicant: DAIKIN INDUSTRIES, LTD., Osaka (JP)

(72) Inventors: Yoshinori Takayama, Osaka (JP); Motofumi Ohtsuji, Osaka (JP); Kouji Inoue, Osaka (JP); Shougo Okabe, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 379 days.

(21) Appl. No.: 17/603,866

(22) PCT Filed: Mar. 4, 2020

(86) PCT No.: PCT/JP2020/009152
§ 371 (c)(1),
(2) Date: Oct. 14, 2021

(87) PCT Pub. No.: WO2020/213279
PCT Pub. Date: Oct. 22, 2020

(65) Prior Publication Data
US 2022/0216742 A1 Jul. 7, 2022

(30) Foreign Application Priority Data
Apr. 17, 2019 (JP) .................................. 2019-078434

(51) Int. Cl.
*H02K 1/14* (2006.01)
*H02K 1/17* (2006.01)
*H02K 1/18* (2006.01)

(52) U.S. Cl.
CPC ............... *H02K 1/148* (2013.01); *H02K 1/17* (2013.01)

(58) Field of Classification Search
CPC ............ H02K 1/14; H02K 1/148; H02K 1/17; H02K 1/18; H02K 1/187
See application file for complete search history.

(56) References Cited

U.S. PATENT DOCUMENTS

| | | | |
|---|---|---|---|
| 9,543,799 B2 * | 1/2017 | Kim | .......................... H02K 3/30 |
| 2013/0169104 A1 * | 7/2013 | Jang | ..................... H02K 15/022 29/596 |

(Continued)

FOREIGN PATENT DOCUMENTS

| | | |
|---|---|---|
| JP | 56-61132 U | 5/1981 |
| JP | 2002-95192 A | 3/2002 |

(Continued)

OTHER PUBLICATIONS

International Preliminary Report of corresponding PCT Application No. PCT/JP2020/009152 dated Oct. 28, 2021.

(Continued)

*Primary Examiner* — Tran N Nguyen
(74) *Attorney, Agent, or Firm* — Global IP Counselors, LLP

(57) ABSTRACT

A stator includes a stator core having a plurality of split cores arranged in an annular shape. Each of the split cores includes a yoke portion and a tooth portion protruding from the yoke portion in a radial direction of the stator core. The yoke portions of adjoining split cores are connected to each other at joint surfaces of adjoining split cores. The joint surfaces are provided with a fitting portion that extends along an axial direction of the stator core from an upper end surface to a lower end surface of the stator core. The fitting portion is provided with a crimped portion.

9 Claims, 10 Drawing Sheets

(56) References Cited

U.S. PATENT DOCUMENTS

2014/0305172 A1 10/2014 Kim et al.
2014/0368080 A1 12/2014 Miyajima et al.
2018/0198343 A1 7/2018 Izumi et al.

FOREIGN PATENT DOCUMENTS

| JP | 2003-69431 A | 3/2003 |
| JP | 2005-102424 A | 4/2005 |
| JP | 2011-217434 A | 10/2011 |
| JP | 2012-115005 A | 6/2012 |
| JP | 2015-2617 A | 1/2015 |
| JP | 2017-46499 A | 3/2017 |

OTHER PUBLICATIONS

International Search Report of corresponding PCT Application No. PCT/JP2020/009152 dated May 26, 2020.
European Search Report of corresponding EP Application No. 20 79 1083.7 dated Mar. 24, 2022.

\* cited by examiner

STATOR AND MOTOR

CROSS-REFERENCE TO RELATED APPLICATIONS

This U.S. National stage application claims priority under 35 U.S.C. § 119(a) to Japanese Patent Application No. 2019-078434, filed in Japan on Apr. 17, 2019, the entire contents of which are hereby incorporated herein by reference.

BACKGROUND

Field of the Invention

The present disclosure relates to stators and motors.

Background Information

Conventionally, there is an inner rotor type stator including an annular stator core formed by coupling a plurality of split cores together (see, for example, Japanese Patent Application Laid-Open No. 2002-95192). Each of the plurality of split cores of the stator has a yoke portion extending in the circumferential direction and a tooth portion extending radially inward from the yoke portion.

SUMMARY

In the above-described conventional stator, each of the split cores has a protruding portion on one side in the circumferential direction of the yoke portion and a recessed portion on the other side in the circumferential direction of the yoke portion. The split cores are assembled into an annular shape by fitting the protruding portion of one split core into the recessed portion of an adjoining split core.

However, in the stator, there is a problem that the adjoining split cores need to be welded to each other at an outer peripheral end of a joint portion between the adjoining split cores in the axial direction of the stator in order to secure the force for fastening the split cores to each other.

The present disclosure proposes a stator capable of securing a fastening force between split cores without welding the split cores to each other, and a motor including the stator.

A stator of the present disclosure includes a stator core including a plurality of split cores arranged in an annular shape. The split cores each include a yoke portion and a tooth portion protruding from the yoke portion in a radial direction of the stator core. The yoke portions of adjoining split cores are connected to each other at joint surfaces of the adjoining split cores, and the joint surfaces are provided with a fitting portion along an axial direction of the stator core from an upper end surface to a lower end surface of the stator core. The fitting portion is provided with a crimped portion.

According to the present disclosure, the joint surfaces are provided with the fitting portion that extends along the axial direction of the stator core from the upper end surface to the lower end surface of the stator core, and the crimped portion is provided in the fitting portion. The fitting portion is prastically deformed at the crimped portion, whereby even if dimensional variations occur in the fitting portion due to working of the fitting portion, the fastening force between the split cores can be improved. Therefore, the fastening force between the split cores can be secured without the split cores being welded to each other. In addition, even if the fitting portion has a small shape, the fastening force between the split cores can be secured, so that the length of a contact portion at the fitting portion can be shortened, a possible leakage flux can be reduced, and the efficiency of a motor including the stator can be improved.

In addition, in the stator according to one aspect of the present disclosure, the crimped portion is provided in the fitting portion on at least one of the upper end surface and the lower end surface of the stator core.

According to the present disclosure, providing a crimped portion in the fitting portion on at least one of the upper end surface and the lower end surface of the stator core allows the fastening force between the split cores to be easily improved. In addition, since distortion due to the crimped portion is limited to at least one of an upper end—side portion and a lower end—side portion of the stator core, influence of iron loss due to the distortion at the crimped portion is small.

In the stator according to one aspect of the present disclosure, the crimped portion is provided across the adjoining split cores.

According to the present disclosure, providing the crimped portion across the adjoining split cores causes plastic deformation to occur over respective portions of the adjoining split cores that constitute the fitting portion of the adjoining split cores. Thus, the fastening force between the split cores can be improved.

In the stator according to one aspect of the present disclosure, the crimped portion is provided across the adjoining split cores in a radial direction of the stator core.

According to the present disclosure, providing the crimped portion across the adjoining split cores in the radial direction of the stator core causes plastic deformation to occur radially over respective portions of the adjoining split cores constituting the fitting portion of the adjoining split cores. Thus, the fastening force between the split cores can be improved.

In the stator according to one aspect of the present disclosure, the fitting portion includes a protruding portion provided on one side in a circumferential direction of the stator core of the yoke portion of one split core and a recessed portion provided on an opposite side in the circumferential direction of the yoke portion of a split core adjoining to the one split core. Each of the protruding portion and the recessed portion includes two linear portions parallel to each other, each linear portion extending from a joint surface—side end of the linear portion, and an arc portion connecting other ends of the two linear portions.

According to the present disclosure, the adjoining split cores can be easily coupled to each other with the protruding portion and the recessed portion each having the two parallel linear portions and the arc portion connecting the other ends of the two linear portions.

A motor according to the present disclosure includes any one of the above stators, and a rotor arranged to face the stator in a radial direction.

According to the present disclosure, the leakage flux of the stator can be reduced, so that the motor is allowed to have an improved efficiency.

According to the present disclosure, it is possible to manufacture a stator including a stator core capable of securing the fastening force between split cores without welding the split cores to each other.

DETAILED DESCRIPTION OF EMBODIMENT(S)

Figure 1:
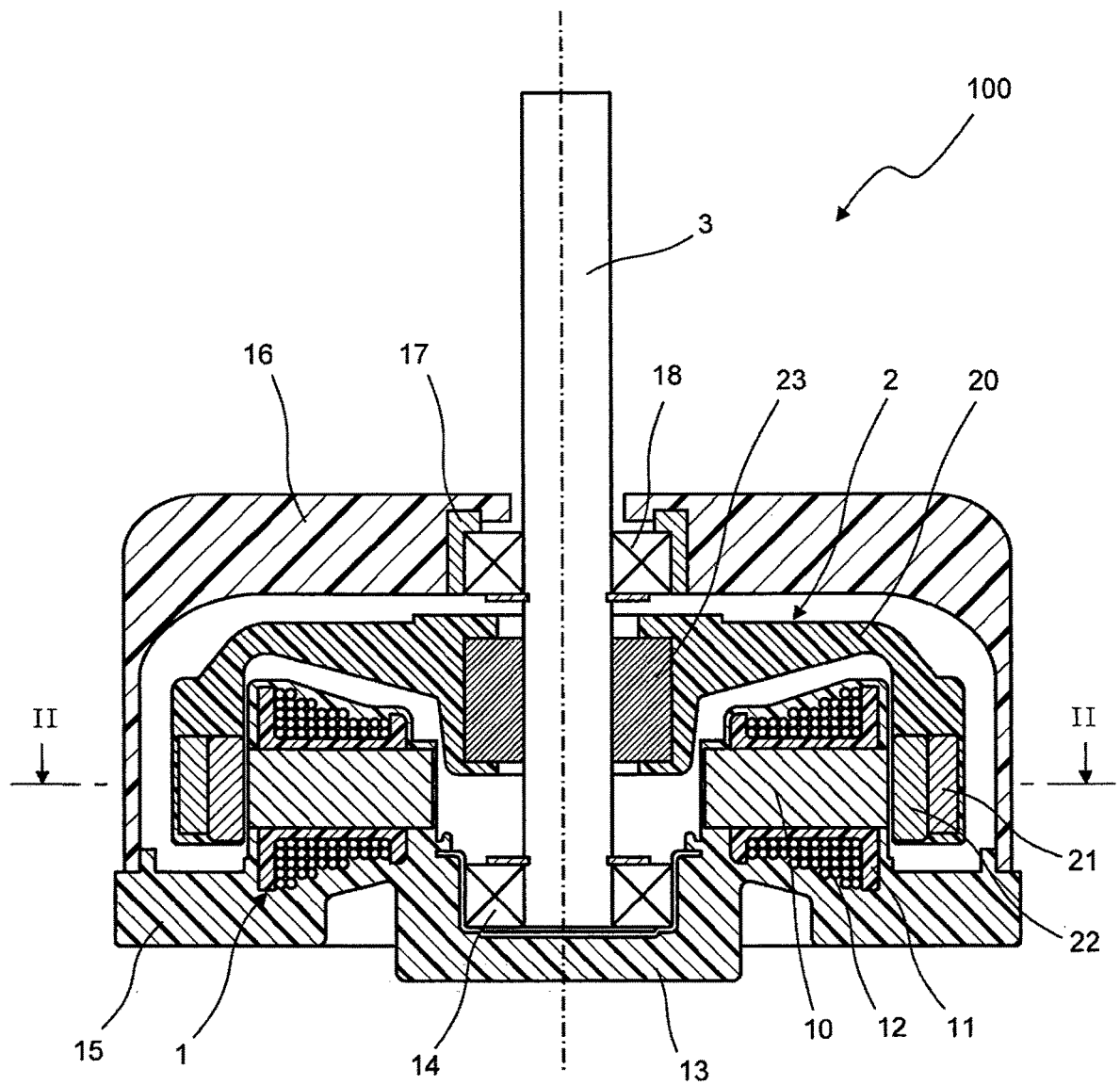
FIG. 1 is a cross-sectional view of a motor including a stator according to a first embodiment of the present disclosure.

Hereinafter, embodiments will be described. It should be noted that in the drawings, the same reference numerals represent the same or corresponding parts. In addition, the dimensions on the drawing such as the length, the width, the thickness, and the depth are appropriately changed from the actual scale for clarity and simplification of the drawing, and do not represent the actual relative dimensions.

First Embodiment

Figure 2:
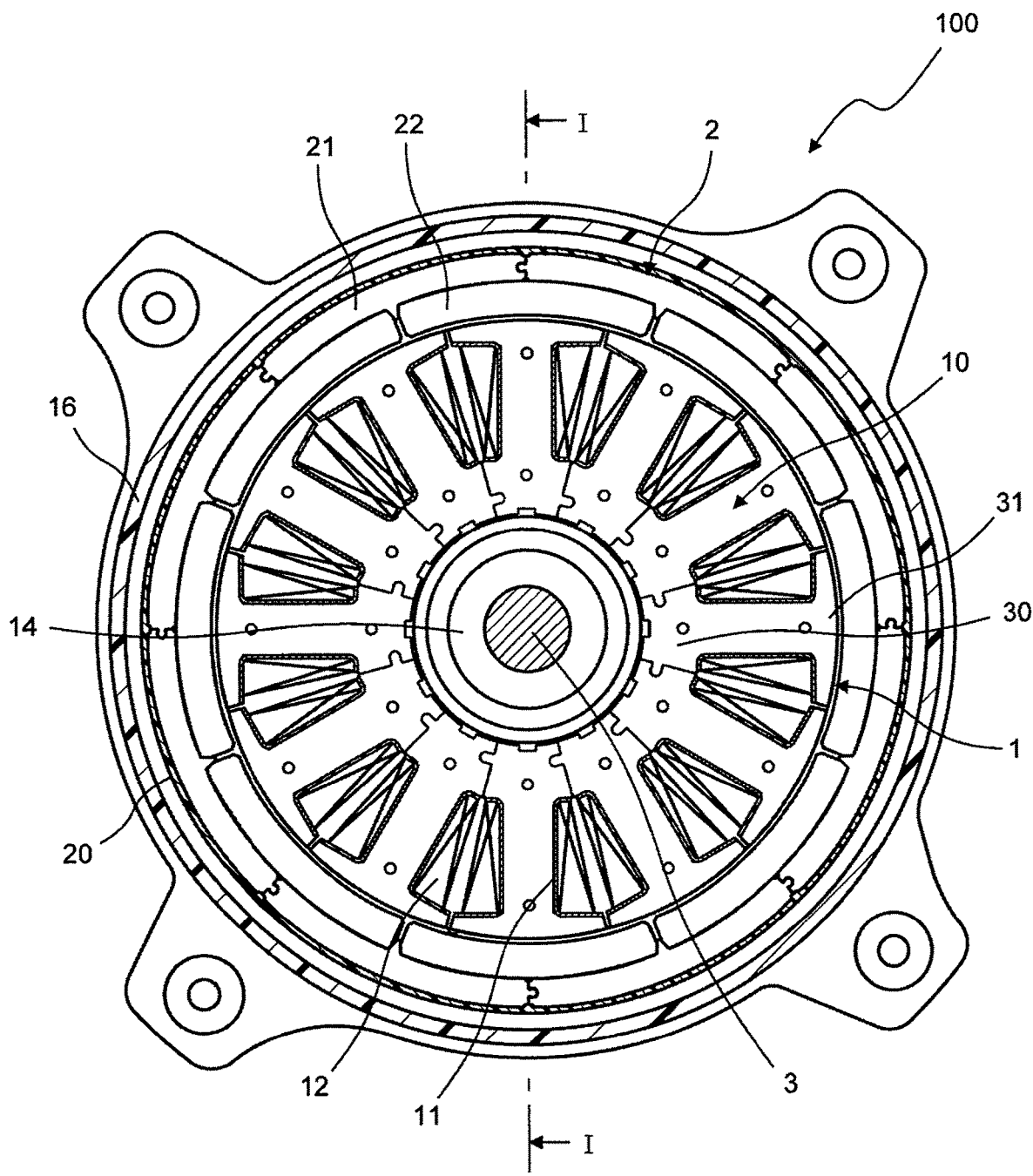
FIG. 2 is a cross-sectional view of the motor taken along line II-II in FIG. 1.

FIG. 1 is a cross-sectional view of a motor 100 including a stator 1 according to a first embodiment of the present disclosure, and shows a cross section of the motor 100 taken along line I-I in FIG. 2. FIG. 2 is a cross-sectional view of the motor 100 taken along line II-II in FIG. 1.

As shown in FIG. 1, the motor 100 is what is called an outer rotor type motor 100, and includes an annular stator 1 and a rotor 2 arranged to face a radially outer side of the stator 1. The motor 100 rotationally drives a member such as a fan (not shown) via a shaft 3.

As shown in FIGS. 1 and 2, the rotor 2 includes a mold resin 20, a plurality of back yokes 21, and a plurality of magnets 22.

The mold resin 20 is formed in a cup shape and covers the stator core 10 of the stator 1. The mold resin 20 is fixed to the shaft 3 via a coupling member 23. In this embodiment, bulk molding compound (BMC) is used for the mold resin 20.

The back yokes 21 and the magnets 22 are integrally molded with the mold resin 20. In the first embodiment, eight back yokes 21 are annularly arranged. Eight magnets 22 are annularly arranged on the radially inner side of the back yokes 21. Magnets 22 and 22 adjacent to each other in the circumferential direction have different magnetism.

The stator 1 includes a stator core 10, an insulator 11, and coils 12.

The stator core 10 includes a stack of electromagnetic steel sheets. The stator core 10 includes an annular stator yoke 30 and a plurality of tooth portions 31 protruding radially outward from an outer circumferential surface of the stator yoke 30. In the first embodiment, 12 tooth portions 31 are arranged at intervals in the circumferential direction.

The insulator 11 is attached to each tooth portion 31 of the stator core 10. The insulator 11 is made of an insulating material such as resin.

The coils 12 are wound around the tooth portions 31 of the stator core 10 by concentrated winding via the insulator 11. Electromagnetic force is generated in the stator core 10 by flowing a current through the coils 12, and the electromagnetic force rotates the rotor 2 together with the shaft 3.

A mold resin portion 13 integrally molds the stator core 10, the insulator 11, and the coils 12. The mold resin portion 13 is made of, for example, bulk molding compound (BMC).

The mold resin portion 13 supports the shaft 3 via a bearing 14. The mold resin portion 13 is provided with a mount 15 for attaching the motor 100 to another member (not shown). A cover 16 is attached to the mount 15. The cover 16 covers the rotor 2 to prevent dust, water, and the like from entering. The cover 16 is formed by integrally molding a bearing housing 17 with a mold resin. The cover 16 supports the shaft 3 via a bearing 18.

Figure 3:
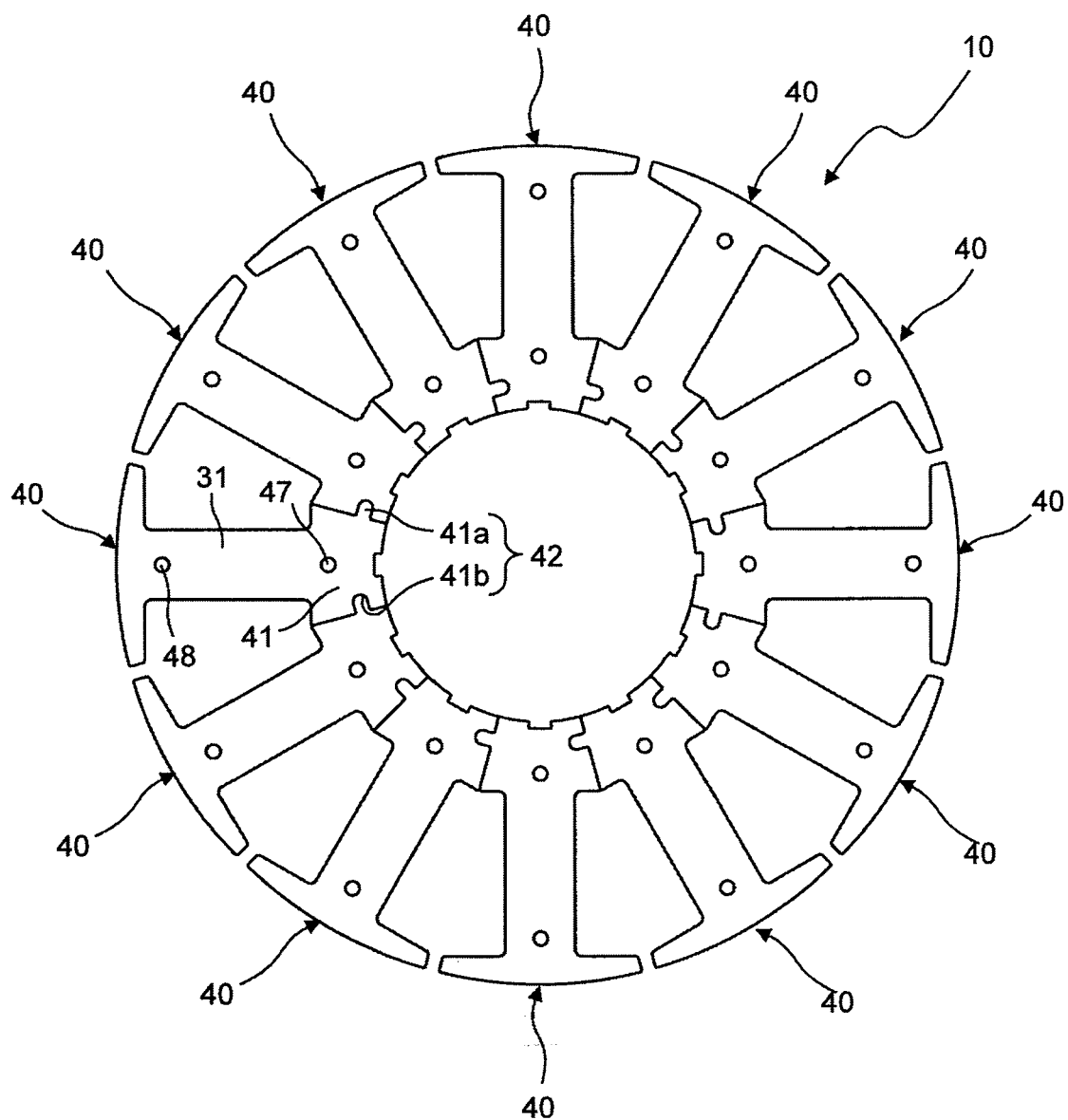
FIG. 3 is a plan view of a stator core.

FIG. 3 is a plan view of the stator core 10. As shown in FIG. 3, the stator core 10 includes a plurality of split cores 40 annularly arranged. The split core 40 includes a yoke portion 41, which is a radially inner portion, and a tooth portion 31 protruding radially outward from the yoke portion 41.

The 12 split cores 40 are annularly arranged, and the yoke portions 41 of the adjacent split cores 40 are connected to each other to form the stator core 10.

Figure 4:
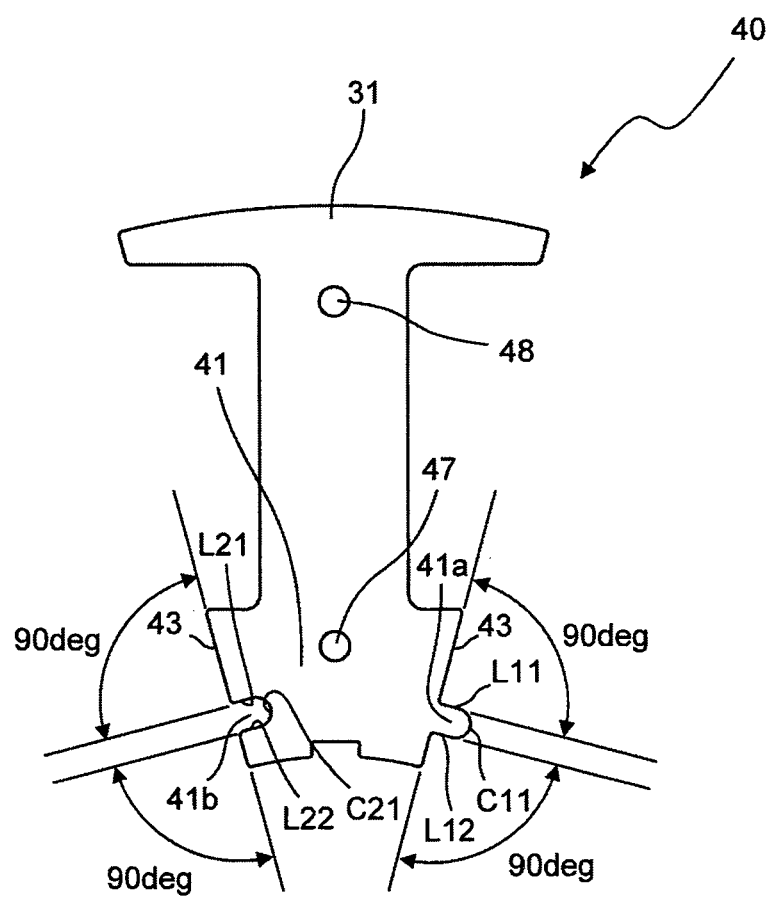
FIG. 4 is a plan view of a split core constituting the stator core.

FIG. 4 is a plan view of one of the split cores 40 constituting the stator core 10. As shown in FIG. 4, the yoke portion 41 of the split core 40 includes a protruding portion 41a and a recessed portion 41b that run along the axial direction of the stator core 10 from an upper end surface to a lower end surface of the split core 40. The protruding portion 41a is provided on one of opposite joint surfaces 43 of the split core, the joint surfaces 43 being arranged in the circumferential direction of the stator core 10. The recessed portion 41b is provided on the other joint surface 43 of the split core.

In a plan view, the protruding portion 41a of the yoke portion 41 has two linear portions L11 and L12 parallel to each other, each extending from its joint surface 43—side end, and an arc portion C11 connecting the other ends of the two linear portions L11 and L12. The arc portion C11 is provided so that the tip (opposite to the joint surface 43) of the protruding portion 41a bulges.

Each of the linear portions L11 and L12 forms an angle of 90 degrees with respect to the associated joint surface 43 of the yoke portion 41.

The recessed portion 41b of the yoke portion 41 also has two linear portions L21 and L22 parallel to each other, each linear portion extending from a joint surface 43—side end of the linear portion, and an arc portion C21 connecting the other ends of the two linear portions L21 and L22. The arc portion C21 is provided so that the side opposite to the joint surface 43 of the recessed portion 41b bulges.

Each of the linear portions L21 and L22 forms an angle of 90 degrees with respect to the associated joint surface 43 of the yoke portion 41.

A crimped portion 47 is provided on the yoke portion 41 of the split core 40, and a crimped portion 48 is provided on a radially outer portion of the tooth portion 31. The crimped portions 47 and 48 fix the electromagnetic steel sheets constituting the split core 40 together.

Figure 5:
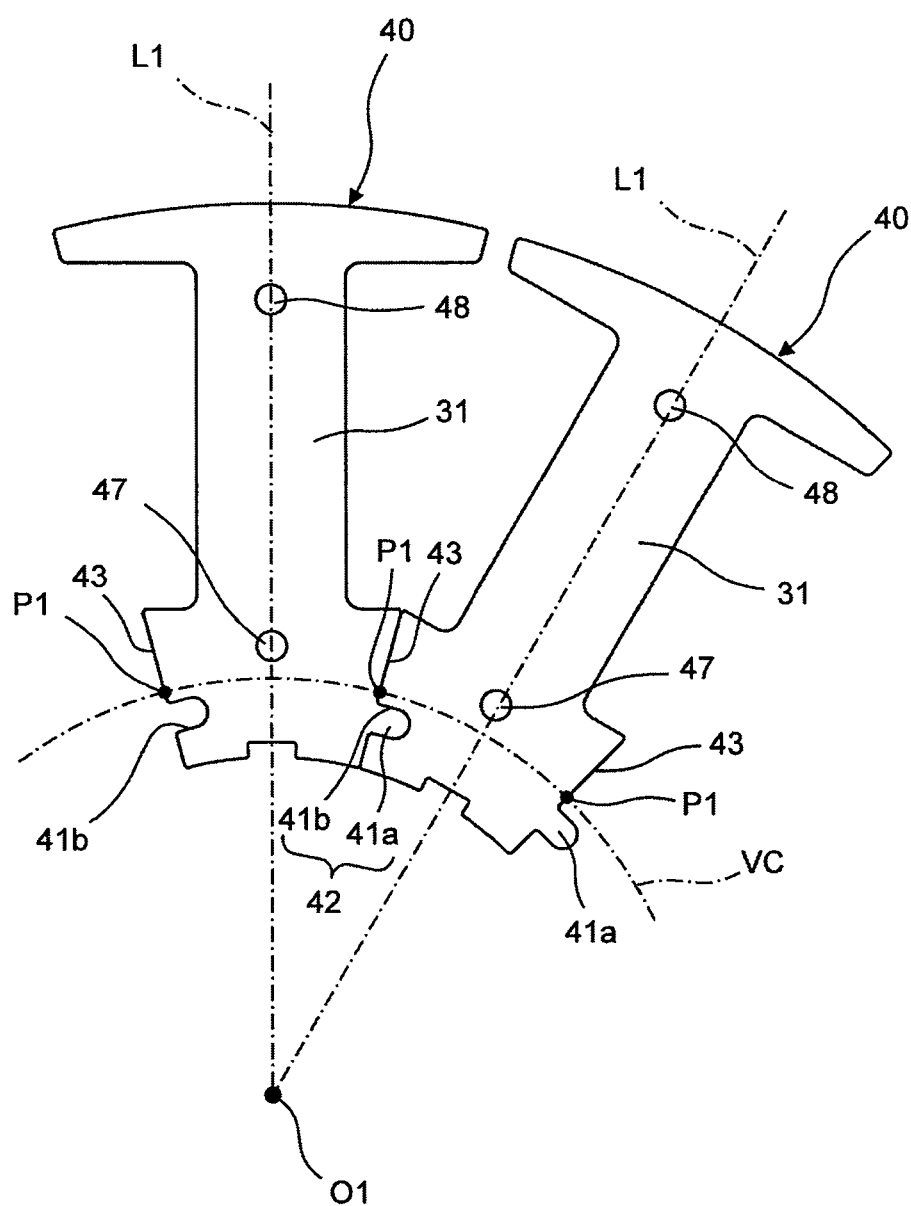
FIG. 5 is a plan view showing a state in which the split cores are connected.

FIG. 5 is a plan view showing a state in which two split cores 40 are connected to each other. In FIG. 5, L1 is a center line in the radial direction of each split core 40. As shown in FIG. 5, the protruding portion 41a of the yoke portion 41 of one split core 40 and the recessed portion 41b of the yoke portion 41 of the other split core 40 are fitted to each other, and the adjacent yoke portions 41 are coupled to each other. The protruding portion 41a and the recessed portion 41b of the yoke portion 41 constitute a fitting portion 42.

The fitting portion 42 includes the protruding portion 41a of the yoke portion 41 of one split core 40 and a peripheral edge portion of the recessed portion 41b defining the recessed portion 41b in the yoke portion 41 of the other split core 40.

On one joint surface 43 of the yoke portion 41 of one split core 40, an end of the fitting portion 42 is positioned radially inward from a center P1 of the joint surface (intersection of a virtual circle VC shown in FIG. 5 and the joint surface 43) between a radially outer end and a radially inner end of the joint surface. The virtual circle VC is a circle centered on the center O1 of the stator core 10 and passing through the centers P1 of the joint surfaces 43 of the yoke portions 41 of the split cores 40. Planes along the joint surfaces 43 of the yoke portions 41 pass through the center O1 of the stator core 10.

On the other hand, outer circumferential portions of adjacent tooth portions 31 and 31 of the split cores 40 are separated from each other.

In this manner, the adjacent yoke portions 41 are connected to each other, and the 12 connected yoke portions 41 constitute the stator yoke 30.

It should be noted that before the adjacent yoke portions 41 are connected to each other, the tooth portion 31 of each split core 40 is covered with a segment of the insulator 11 (shown in FIGS. 1 and 2), and a coil 12 (shown in FIG. 1) is wound around the tooth portion 31 covered with the segment of the insulator 11.

In the stator 1 of the first embodiment, the fitting portion 42 provided in the yoke portions 41 of the adjoining split cores 40 extends in a direction orthogonal to the joint surfaces 43.

Here, as shown in FIGS. 6 to 11 showing Examples 1 to 6, any one of crimped portions 44A to 44G is provided in the fitting portion 42 at the upper end surface and the lower end surface of the stator core 10. Thus, the fitting portion 42 is plastically deformed, so that the fastening force between the split cores 40 can be improved. In addition, even if the fitting portion 42 has a small shape, since the fastening force between the split cores 40 can be secured by the crimped portion 44A to 44G, the length of the contact portion in the fitting portion 42 can be shortened and the leakage flux can be reduced. In addition, since the distortion due to the crimped portion 44A to 44G is limited to the upper end side and the lower end side of the stator core 10, the influence of the iron loss due to the distortion of the crimped portion 44A to 44G is small.

Figure 6:
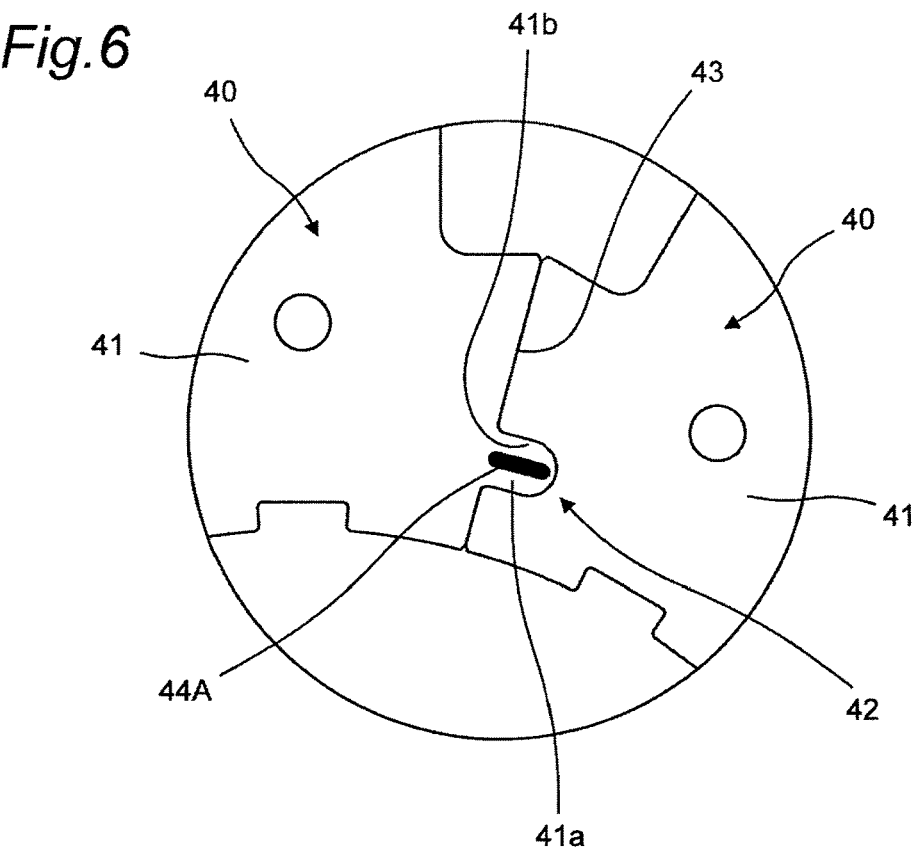
FIG. 6 is an enlarged view of a part including a fitting portion of split cores of Example 1.

FIG. 6 shows an enlarged view of a part including the fitting portion 42 of the adjoining split cores 40 of the Example 1. As shown in FIG. 6, a thick linear crimped portion 44A is provided in the protruding portion 41a of the fitting portion 42 of the yoke portion 41 such that the crimped portion 44A has a longitudinal direction along the circumferential direction of the stator core 10.

Figure 7:
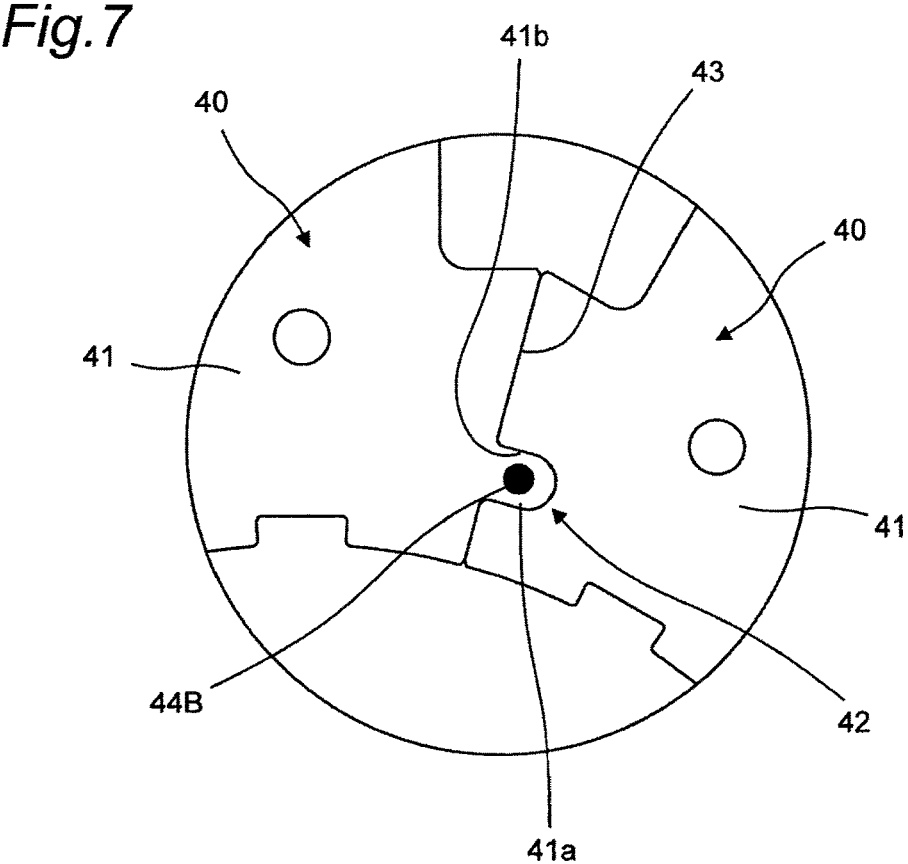
FIG. 7 is an enlarged view of a part including a fitting portion of split cores of Example 2.

FIG. 7 shows an enlarged view of a part including the fitting portion 42 of the adjoining split cores 40 of the Example 2. As shown in FIG. 7, a circular-shaped crimped portion 44B is provided in the protruding portion 41a of the fitting portion 42 of the adjoining yoke portions 41.

Figure 8:
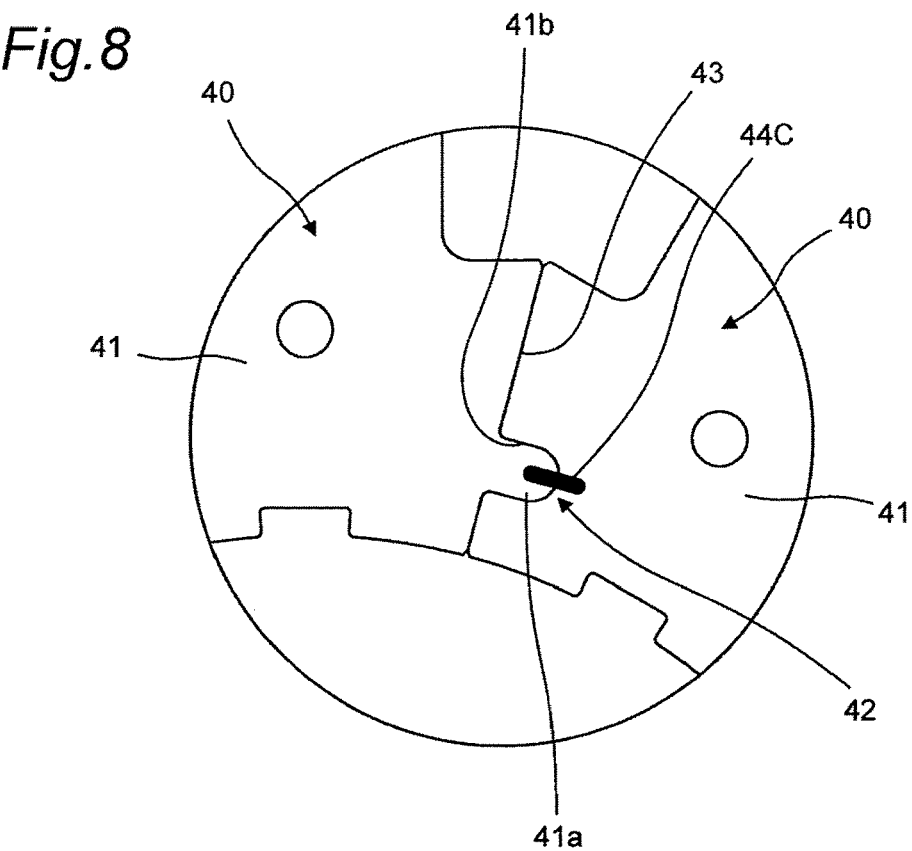
FIG. 8 is an enlarged view of a part including a fitting portion of split cores of Example 3.

FIG. 8 is an enlarged view of a part including the fitting portion 42 of the adjoining split cores 40 of the Example 3. As shown in FIG. 8, a thick linear crimped portion 44 C is provided across the tip portion of the protruding portion 41a of one of the adjoining yoke portions 41 and the other of the adjoining yoke portions 41 such that the crimped portion 44C has a longitudinal direction along the circumferential direction of the stator core 10.

Figure 9:
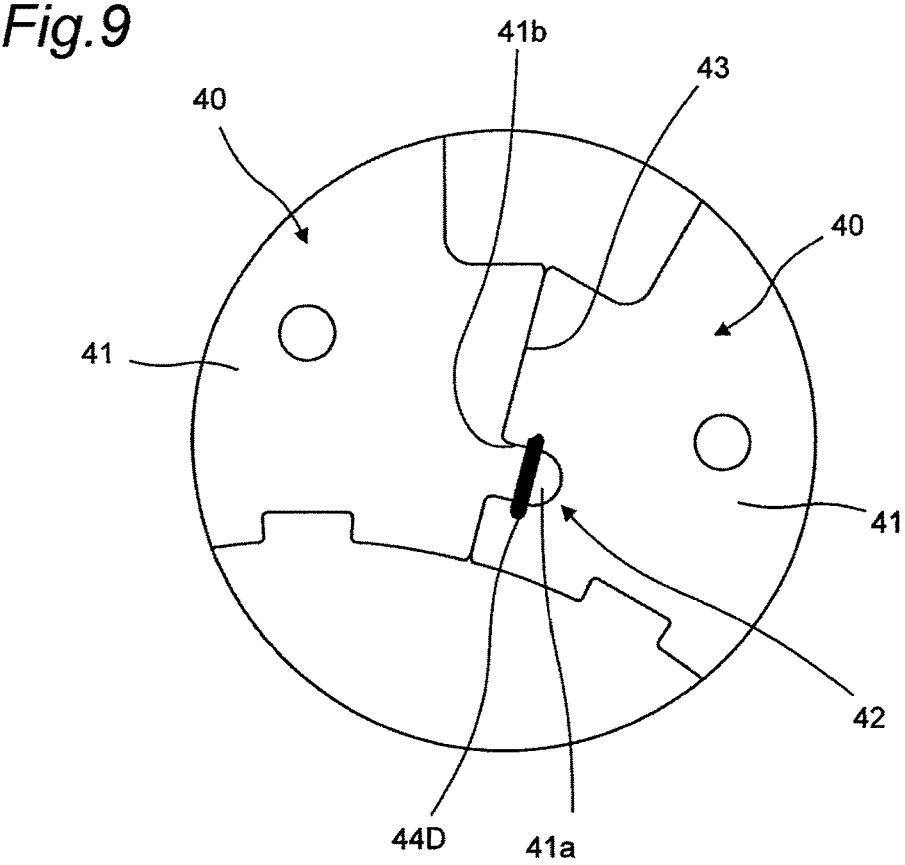
FIG. 9 is an enlarged view of a part including a fitting portion of split cores of Example 4.

FIG. 9 is an enlarged view of a part including the fitting portion 42 of the adjoining split cores 40 of the Example 4. As shown in FIG. 9, a thick linear crimped portion 44D is provided across the protruding portion 41a of one of the adjoining yoke portion 41, and the other of the adjoining yoke portion 41 on both radial sides of the protruding portion 41a such that the crimped portion has a longitudinal direction along the radial direction.

Figure 10:
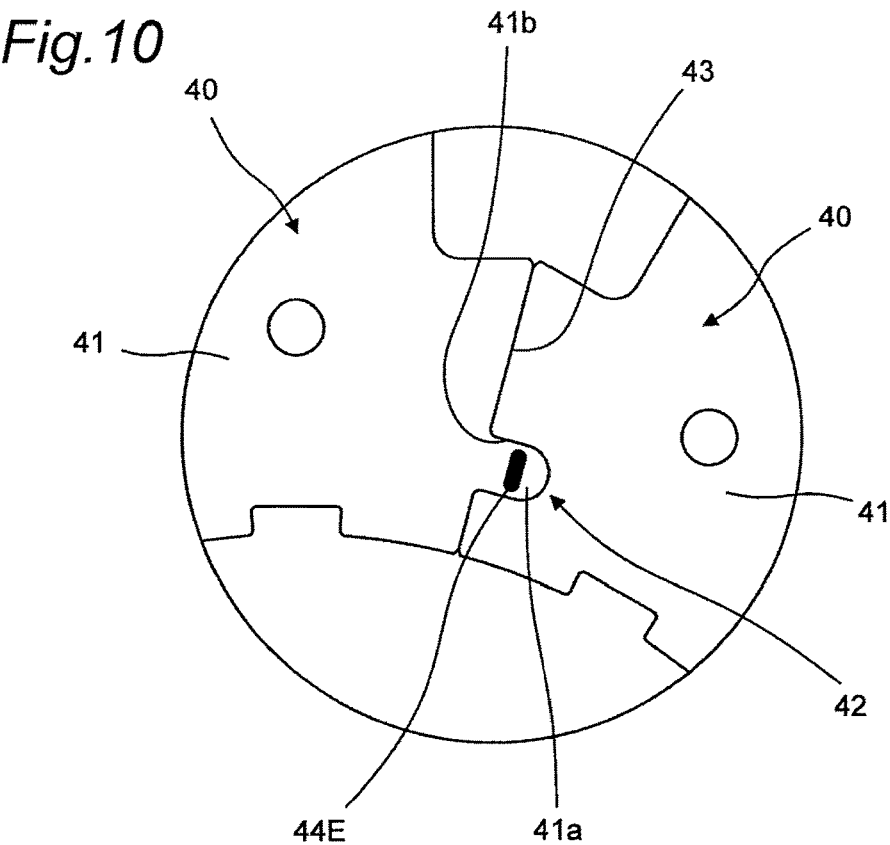
FIG. 10 is an enlarged view of a part including a fitting portion of split cores of Example 5.

FIG. 10 is an enlarged view of a part including the fitting portion of the adjoining split cores 40 of the Example 5. As shown in FIG. 10, a thick linear crimped portion 44E is provided in the protruding portion 41a of one of adjoining yoke portions 41 such that the crimped portion 44E has a longitudinal direction along the radial direction.

Figure 11:
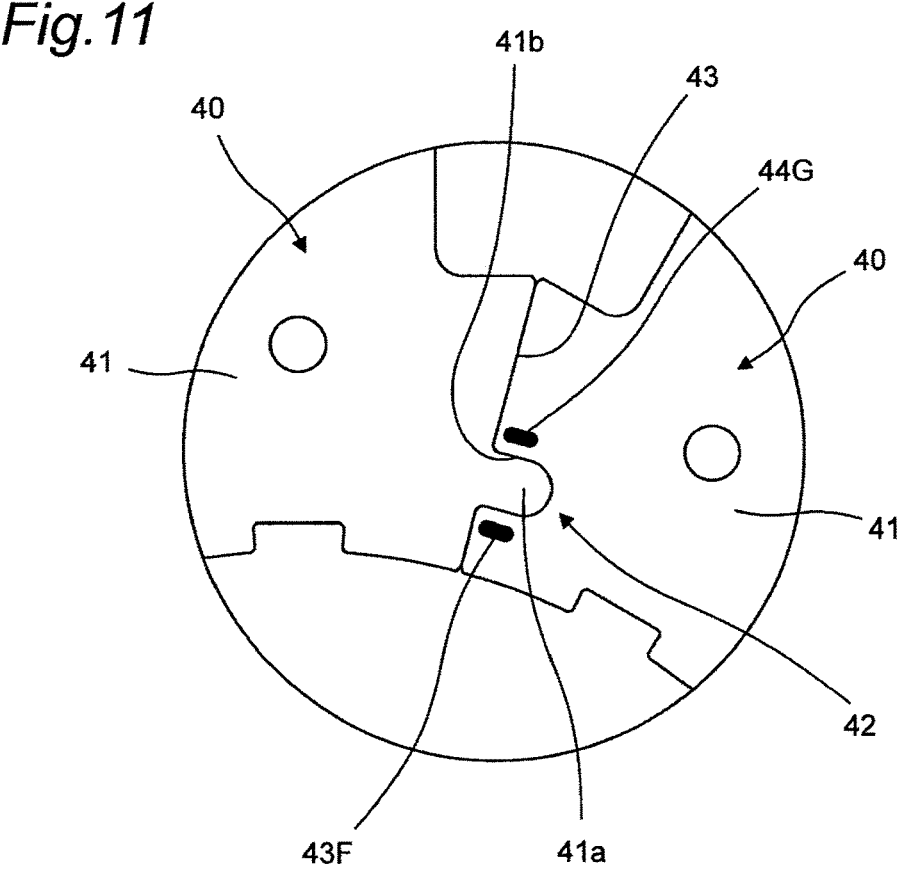
FIG. 11 is an enlarged view of a part including a fitting portion of split cores of Example 6.

FIG. 11 is an enlarged view of a part including the fitting portion 42 of the adjoining split cores 40 of the Example 6. As shown in FIG. 11, thick linear crimped portions 44F and 44G are provided on both radial sides of the recessed portion 41b of one of the adjoining yoke portion 41 such that the crimped portions 44F and 44G have a longitudinal direction along the circumferential direction of the stator core 10.

Figure 12:
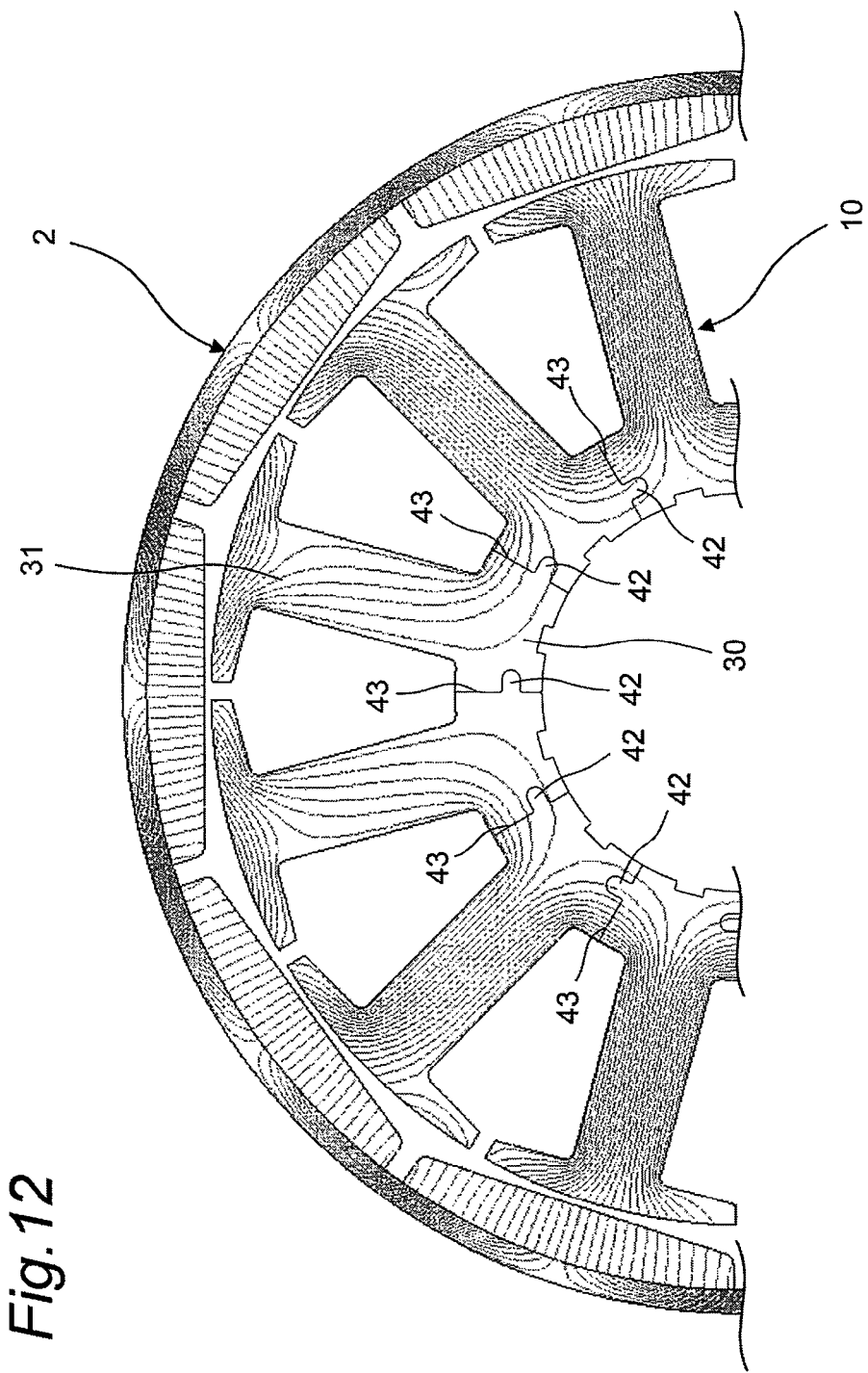
FIG. 12 is a diagram showing a magnetic flux distribution of the stator core.

FIG. 12 shows a magnetic flux distribution of the stator core 10 obtained by simulation. It should be noted that in FIG. 12, the rotor 2 has a configuration for simulation, unlike the configuration in FIG. 2.

As shown in FIG. 12, the magnetic flux density in the fitting portions 42 of the split cores 40 is lower than the magnetic flux density in regions, located on the radially outer side of the fitting portions 42, of the joint surfaces 43 of the split cores 40. Therefore, the leakage flux due to the fitting portions 42 can be reduced.

According to the stator 1 having the above configuration, the fitting portion 42 is provided on the joint surfaces 43 of the connected yoke portions 41 of the adjoining split cores 40, and the fitting portion 42 is provided with the crimped portion 44A to 44G. The fitting portion is prastically deformed at the crimped portion, whereby even if dimensional variations occur in the fitting portion 42 due to working of the fitting portion, the fastening force between the split cores 40 can be improved. Therefore, the fastening force between the split cores 40 can be secured without the split cores 40 being welded to each other. In addition, even if the fitting portion 42 has a small shape, the fastening force between the split cores 40 can be secured, so that the length of the contact portion at the fitting portion 42 can be shortened and the leakage flux can be reduced, and the efficiency of the motor 100 can be improved.

As shown in FIGS. 6 to 11, providing the fitting portion 42 with the crimped portion 44A to 44G on the upper end surface and the lower end surface of the stator core 10 allows the fastening force between the split cores 40 to be easily improved.

As shown in FIGS. 8 and 9, since providing the crimped portion 44C and 44D across the adjoining split cores 40 causes plastic deformation to occur over the portions constituting the fitting portions 42 of the adjoining split cores 40, the fastening force between the split cores 40 can be further improved.

As shown in FIG. 9, since providing the crimped portion 44D across the adjoining split cores 40 in the radial direction of the stator core 10 causes plastic deformation to occur radially over the portions constituting the fitting portions 42 of the adjoining split cores 40, the fastening force between the split cores 40 can be further improved.

The protruding portion 41a of the fitting portion 42 has a shape having two linear portions L11 and L12 parallel to each other, each linear portion L11 and L12 extending from a joint surface 43—side end of the linear portion L11 and L12, and an arc portion C11 connecting the other ends of the two linear portions L11 and L12. The recessed portion 41b of the fitting portion 42 has a shape having two linear portions L21 and L22 parallel to each other, each linear portion L21 and L22 extending from a joint surface 43—side end of the linear portion L21 and L22, and an arc portion C21 connecting the other ends of the two linear portions L21 and L22. Due to the shapes of the protruding portion 41a and the recess portion 41b, the protruding portion 41a of one split core 40 of the two adjoining split cores 40 can be inserted into the recessed portion 41b of the other split core 40 in the circumferential direction of the stator core 10, and the split cores 40 can be easily coupled to each other.

According to the motor 100 having the above configuration, the leakage flux of the stator 1 can be reduced, and the efficiency can be improved.

In the first embodiment, in a plan view, the protruding portion 41a and the recessed portion 41b of the fitting portion 42 each are provided on the associated joint surfaces 43 of the yoke portions 41 in a radial position inside of the virtual circle VC centered on the center O1 of the stator core 10 and passing through the centers P1 of the joint surfaces 43 of the yoke portions 41. However, regardless of the position on the joint surfaces of the yoke portions, the fitting portion has only to be provided on the joint surfaces.

In the first embodiment, the protruding portion 41a of the fitting portion 42 has a shape having two linear portions L11 and L12 parallel to each other, each extending from one end on the joint surface 43 side and an arc portion C11 connecting the other ends of the two linear portions L11 and L12, and the recessed portion 41b of the fitting portion 42 has a shape having two linear portions L21 and L22 parallel to each other, each extending from one end on the joint surface 43 side and an arc portion C21 connecting the other ends of the two linear portions L21 and L22. However, the shapes of the protruding portion and the recessed portion of the fitting portion 42 are not limited thereto. For example, one of the two linear portions parallel to each other of the protruding portion and the recessed portion of the fitting portion may be a curved portion, or two curved portions may be used instead of the two linear portions. Also, polygonal portions may be used instead of the arc portions.

Second Embodiment

Figure 13:
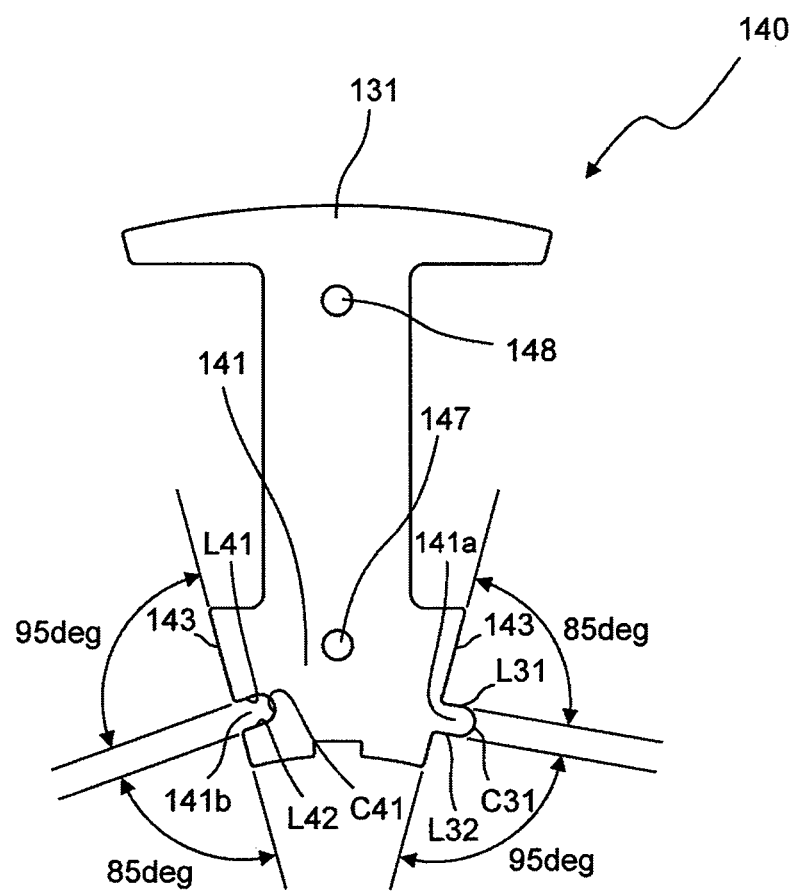
FIG. 13 is a plan view of a split core constituting a stator core of a stator according to a second embodiment of the present disclosure.

FIG. 13 is a plan view of one of split cores 140 constituting a stator core of a stator according to a second embodiment of the present disclosure. The split core 140 of the stator of the second embodiment has the same configuration as the split core 40 of the stator 1 of the first embodiment except for a fitting portion 142 including a protruding portion 141a and a recessed portion 141b of a yoke portion 141, and FIGS. 1 and 2 will be referred to for describing the stator of the second embodiment.

As shown in FIG. 13, the yoke portion 141 of the split core 140 includes a protruding portion 141a provided on one side in the circumferential direction of the stator core 10 and a recessed portion 141b provided on the other side in the circumferential direction.

In a plan view, the protruding portion 141a of the yoke portion 141 has two linear portions L31 and L32 parallel to each other, each extending from a joint surface 143—side end of the linear portion, and an arc portion C31 connecting the other ends of the two linear portions L31 and L32. The arc portion C31 is provided such that a tip side (a side opposite to the joint surface 143) of the protruding portion 141a bulges.

The linear portion L31 forms an angle of 85 degrees with respect to the associated joint surface 143 located on one side in the circumferential direction of the yoke portion 141. In addition, the linear portion L32 forms an angle of 95 degrees with respect to the associated joint surface 143 of the yoke portion 141.

The recessed portion 141b of the yoke 141 has two linear portions L41 and L42 parallel to each other, each extending from a joint surface 143—side end, and an arc portion C41 connecting the other ends of the two linear portions L41 and L42. The arc portion C41 is provided such that a side, opposite to the associated joint surface 143, of the recessed portion 141b bulges.

The linear portion L41 forms an angle of 95 degrees with respect to the associated joint surface 143 located on the other side in the circumferential direction of the yoke portion 141. In addition, the linear portion L42 forms an angle of 85 degrees with respect to the associated joint surface 143 of the yoke portion 141.

A crimped portion 147 is provided on the yoke portion 141 of the split core 140, and a crimped portion 148 is provided on a radially outer portion of a tooth portion 131 of the split core. The crimped portions 147 and 148 integrally fix a plurality of electromagnetic steel sheets constituting the split core 40.

The stator of the second embodiment has the same effects as the stator 1 of the first embodiment.

In the stator of the second embodiment, the fitting portion 142 provided in the yoke portion 141 of the split core 140 extends obliquely outward with respect to the direction orthogonal to the joint surface 143. Thus, since the fit of the fitting portion 142 is less likely to be released by the force acting on the split core 140 in the direction orthogonal to the joint surface 143, the coupling force between the split cores 140 can be maintained.

In the first and second embodiments, the outer rotor type stator 1 and the motor 100 including the stator 1 have been described, but the present invention may be applied to an inner rotor type stator and a motor including the stator.

In the first and second embodiments, the yoke portions 41, 141 of the annularly arranged split cores 40, 140 are connected by the fitting portions 42, 142. The fitting portions are not limited to those shaped as described above, and have only to have a fitting structure provided along the axial direction of the stator core from the upper end surface to the lower end surface of the stator core on the joint surfaces where the yoke portions of the adjoining split cores are connected.

Furthermore, the joint surface—side end of the fitting portion is preferably positioned radially inward from the center between the radially outer end and the radially inner end of the joint surface of the yoke portion of the split core.

In this case, a part on the side opposite to the joint surface of the fitting portion may be positioned radially outward from a virtual circle centered on the center of the stator core and passing through the center between the radially outer end and the radially inner end of the joint surface.

Although specific embodiments of the present disclosure have been described herein, the present disclosure is not limited to the first and second embodiments, and various modifications can be made within the scope of the present disclosure and implemented.

What is claimed is:

1. A stator comprising:
   a stator core including a plurality of split cores arranged in an annular shape, each of the split cores including a yoke portion and a tooth portion protruding from the yoke portion in a radial direction of the stator core,
   the yoke portions of adjoining split cores being connected to each other at joint surfaces of adjoining split cores, and the joint surfaces being provided with a fitting portion that extends along an axial direction of the stator core from an upper end surface to a lower end surface of the stator core,
   the fitting portion being provided with a crimped portion,
   the fitting portion of the adjoining split cores including
      a protruding portion provided on one side in a circumferential direction of the stator core of the yoke portion of one split core and
      a recessed portion provided on an opposite side in the circumferential direction of the yoke portion of a split core adjoining to the one split core,
   wherein on one joint surface of the yoke portion of the one split core, a joint surface side end of the fitting portion is positioned radially inward from a center of the joint surface between a radially outer end and a radially inner end of the joint surface.

2. The stator according to claim 1, wherein
   the crimped portion is provided in the fitting portion on at least one of the upper end surface and the lower end surface of the stator core.

3. The stator according to claim 1, wherein
   the crimped portion is provided across the adjoining split cores.

4. The stator according to claim 1, wherein
   the crimped portion is provided across the adjoining split cores in a radial direction of the stator core.

5. The stator according to claim 1, wherein
   each of the protruding portion and the recessed portion includes
      two linear portions parallel to each other, each linear portion extending from a joint surface side end of the linear portion, and
      an arc portion connecting other ends of the two linear portions.

6. A motor including the stator according to claim 1, the motor further comprising:
   a rotor arranged to face the stator in a radial direction.

7. The motor according to claim 6, wherein
   the motor is an outer rotor type motor.

8. The stator according to claim 1, wherein
   the protruding portion and the recessed portion are entirely positioned radially inward from a radial center of the joint surfaces of the adjacent stator cores between the radially outer end of the joint surfaces and the radially inner end of the joint surfaces.

9. The stator according to claim 1, wherein
   the magnetic flux density in the fitting portion is lower than the magnetic flux density in a region, located on the radially outer side of the fitting portion, of the joint surfaces.

* * * * *